Sept. 30, 1952  S. G. JOHNSON  2,611,970
INDICATING COMPARATOR HAVING PIVOTED JAWS
Filed Sept. 29, 1947  4 Sheets-Sheet 1
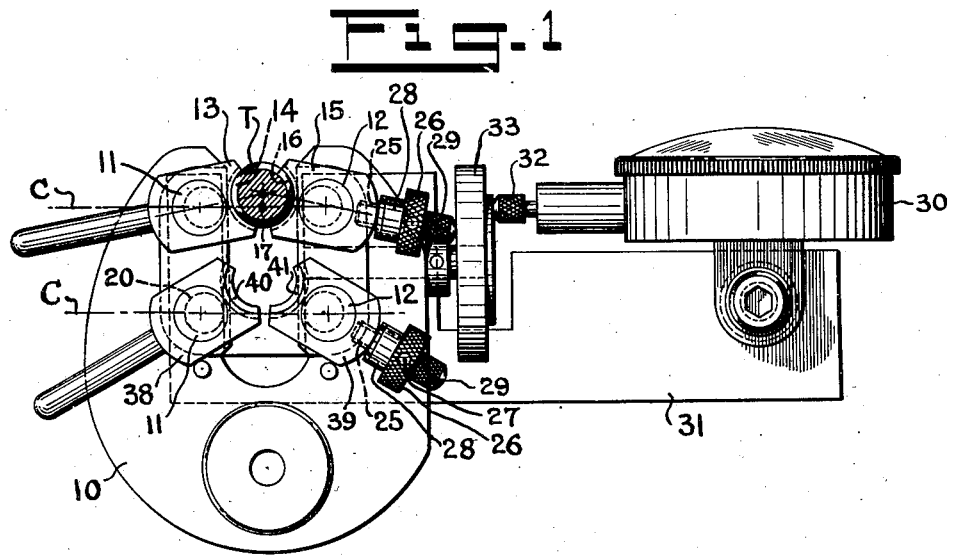
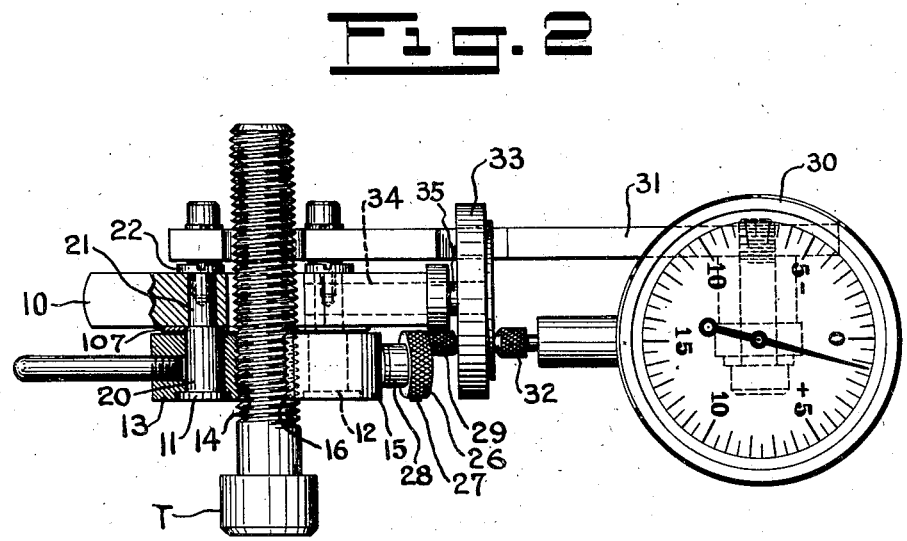
INVENTOR.
STANLEY G. JOHNSON
BY
Bohleber, Fassett Montstream
ATTORNEYS Sept. 30, 1952 S. G. JOHNSON 2,611,970
INDICATING COMPARATOR HAVING PIVOTED JAWS
Filed Sept. 29, 1947 4 Sheets-Sheet 2
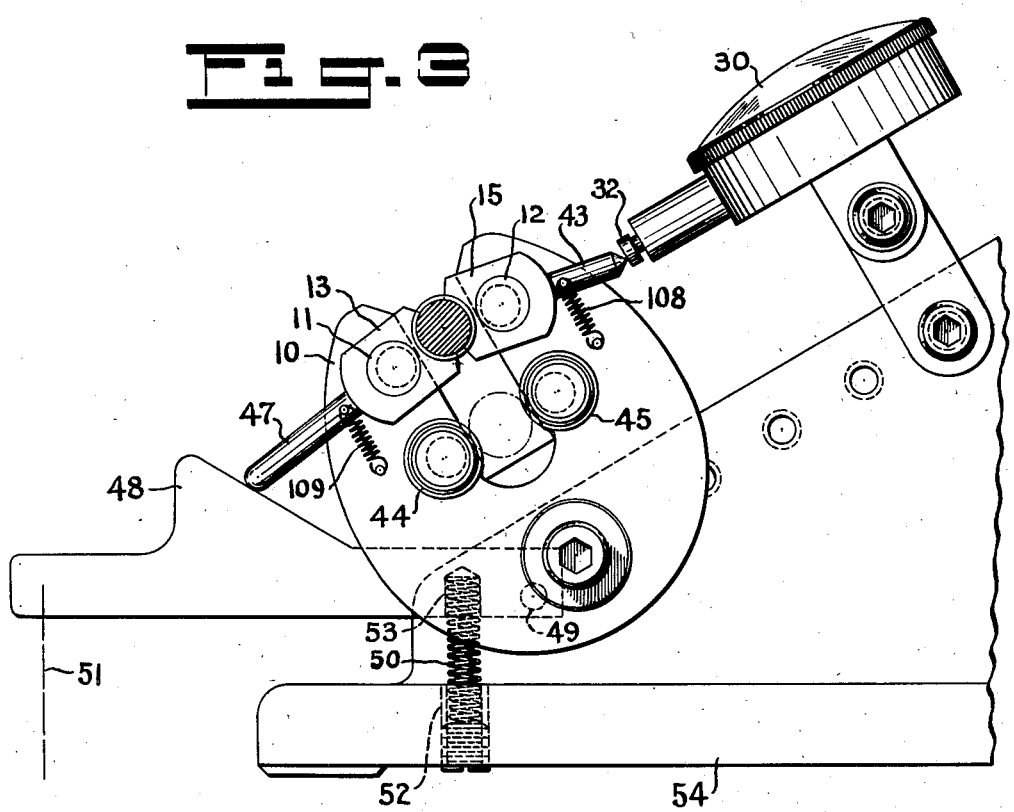
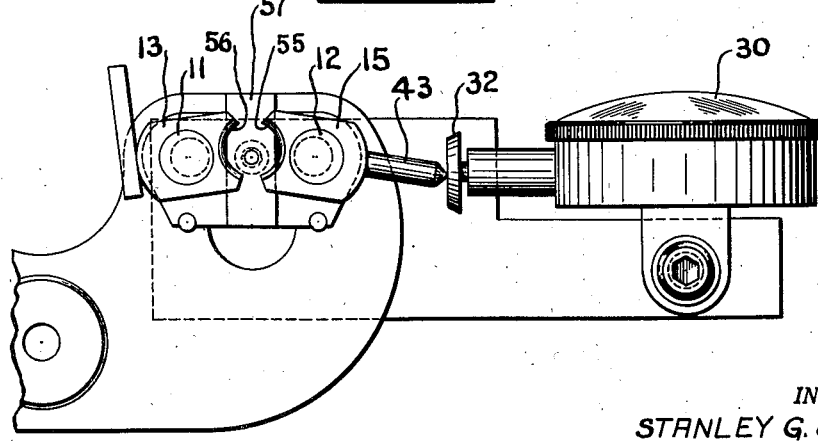
INVENTOR.
STANLEY G. JOHNSON
BY
Bohleber, Fassett + Montstream
ATTORNEYS Sept. 30, 1952     S. G. JOHNSON     2,611,970
INDICATING COMPARATOR HAVING PIVOTED JAWS
Filed Sept. 29, 1947     4 Sheets-Sheet 3
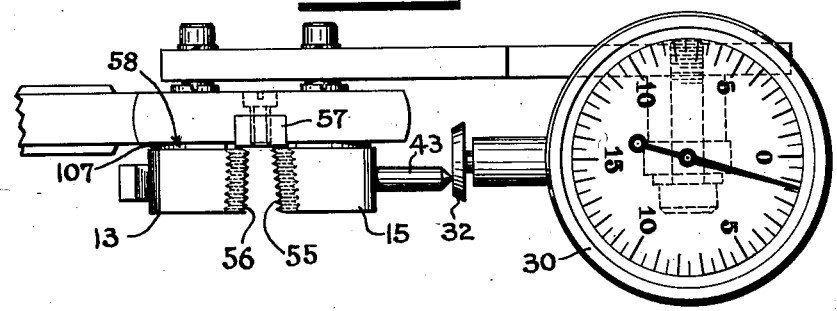
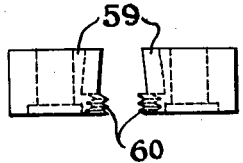 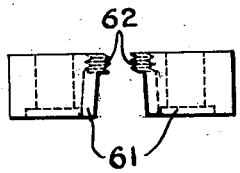
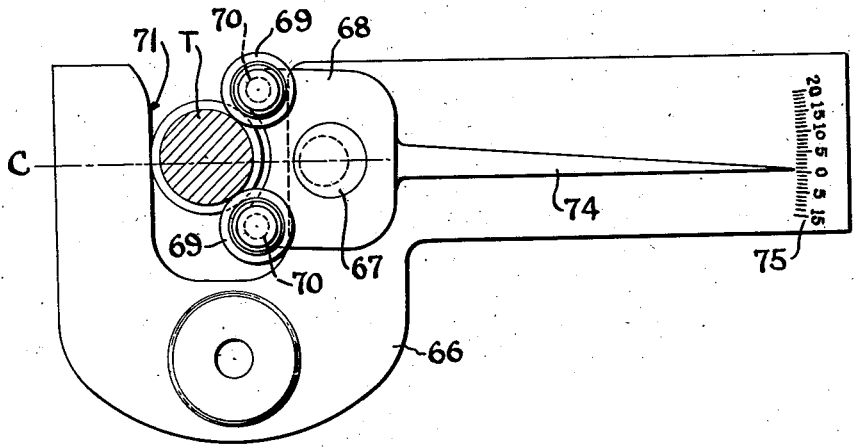
INVENTOR.
STANLEY G. JOHNSON
BY
*Bohleber, Fassett & Montstream*
ATTORNEYS Sept. 30, 1952  S. G. JOHNSON  2,611,970
INDICATING COMPARATOR HAVING PIVOTED JAWS
Filed Sept. 29, 1947  4 Sheets-Sheet 4

INVENTOR.
STANLEY G. JOHNSON
BY
Bohleber, Fassett & Montstream
ATTORNEYS

Patented Sept. 30, 1952

2,611,970

UNITED STATES PATENT OFFICE 2,611,970

INDICATING COMPARATOR HAVING PIVOTED JAWS

Stanley G. Johnson, West Hartford, Conn., assignor to The Johnson Gage Company, Bloomfield, Conn., a corporation of Connecticut Application September 29, 1947, Serial No. 776,796

12 Claims. (Cl. 33—174)

The invention relates to a type of gage having pivoted gage members at least one of which engages a part to be tested at two or more points around the periphery of the test part. In its preferred form the gage includes a pair of pivoted gaging members having concave gaging surfaces or means so that the gage approximates a ring type of gage with contact approximately completely around the entire periphery of the test part. The gage members are pivoted so that the gaging surfaces or means are directed radially outwardly and move in paths radially spaced from each other. With plain contacting gaging surfaces the gage may be used to test plain cylindrical or tapered test parts. The gaging surfaces or means may be threaded so that the gage may be used to test straight or tapered screw threads.

It is an object of the invention to construct a gage of the pivoted gage member type which can be used as a comparator or analyzer gage and is constructed in a simple manner which can be inexpensively manufactured.

Another object of the invention is to construct a gage having pivoted gaging members in which a single indicator may be used to indicate a reading for at least two sets of gage members.

A still further object is to construct a gage for testing the squareness of a surface or the concentricity of a cylindrical surface with respect to a screw threaded portion.

Another object is to construct a gage for testing the squareness of a surface or the concentricity of a cylindrical surface with respect to a screw threaded portion and at the same time gage the screw thread.

Other objects will be more apparent from the following description when taken in connection with accompanying drawings illustrating preferred embodiments of the invention in which:

Figure 1 is a plan view of an analyzer type of gage having two sets of gage members operating a single indicator.

Figure 2 is a top elevation of the gage of Figure 1.

Figure 3 is a plan view of a comparator type of gage which illustrates also a construction by which uniform pressure may be exerted upon a gage member or a test part within the gage.

Figure 4 is a plan view of a gage provided with an anvil to be used particularly for gaging tapered cylindrical surfaces or tapered threads.

Figure 5 is a top view of the gage of Figure 4.

Figure 6 is a side elevational view of a pair of pivoted gage members designed to engage the smaller diameter of a tapered test part.

Figure 7 is a plan view of a pair of pivoted gage members designed to engage a tapered test part at the larger diameter thereof.

Figure 8 is a plan view of a simple type of gage which embodies the principles of the invention.

Figure 9:
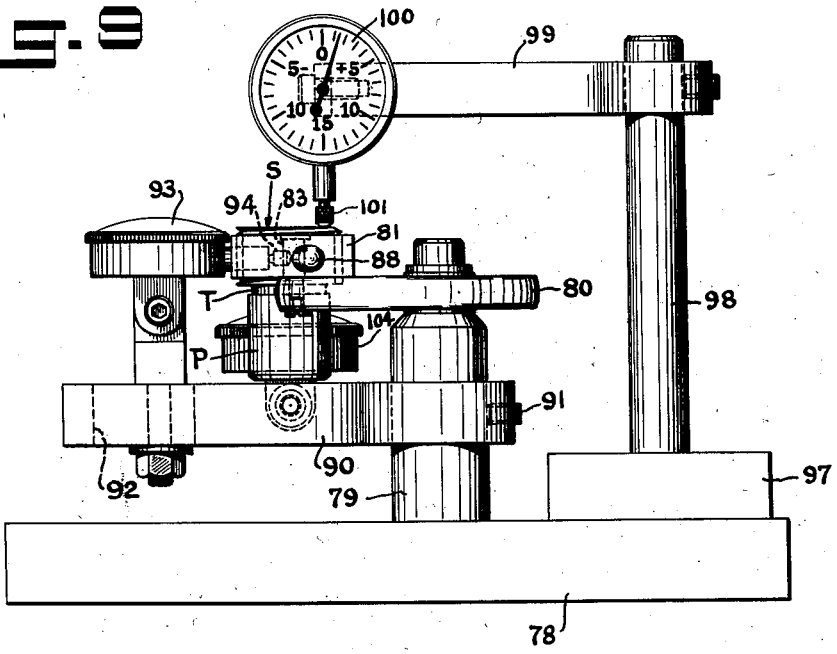
Figure 9 is a side elevation of a gage for testing the squareness or eccentricity of a portion of a test part with respect to a cylindrical or threaded portion thereof. The cylindrical or threaded portion may be tested at the same time.

The gage of the invention, except a construction such as that of Figure 8, has all of the advantages of a ring type of gage in determining the ability of a test part, having plain surfaces with or without a groove or ridge or having threads which may be straight or tapered, to assemble with its mating part such as a plain or threaded hole. The gage has important advantages over the solid ring type of gage in that high speed in inspection is achieved because the test part is laterally presented to the gage rather than threaded therein as in a ring gage. Also the gage of the invention does not wear "bell-mouthed" and overall wear is also substantially reduced. Again the described gage herein will accept perfectly dimensioned thin walled test parts but which may be warped out of round, because the toggle like action of the closing gage members may be used to squeeze the thin walled part to accept the same whereas other types of gages must necessarily reject such part.

The gage includes a frame 10 of any suitable kind which may be mounted upon a base, such as shown in Figure 3, and would normally be held inclined as shown in that figure. The frame carries pivotal supporting means of any desirable construction that illustrated being a pivot pin 11 which is spaced from a second pivot pin 12, as will be described more fully hereinafter. A pivoted gage member 13 is mounted upon the pivot pin 11 for pivotal movement thereon, which gage member has a gaging means 14 which is shown as a concave gaging surface or means. A similar gage member 15 is mounted upon the pivot pin 12, which gage member also is provided with gaging means 16 which is illustrated as a concave gaging surface or means.

The pivotal supporting means 11 and 12 for the gage members 13 and 15 are spaced from each other so that the gaging axis 17, as determined by the point which corresponds with the axis of the part being tested, lies between one gage member such as 13 and the pivotal supporting means 12 for the other gage member 15 with its gaging means 16 facing substantially radially outwardly as viewed from its pivotal supporting means 12. The pivotal supporting means 12 is also located so that the gaging member 15 pivots towards and away from the other gaging member into gaging position upon a circular path which is radially spaced from the other gage member 13 so that with a pair of pivoted gage members there is no interception or abutting relation of one gage member by the other gage member during their respective pivotal movement.

Any suitable means may be used to adjust the position of at least one gage member with respect to the other, that illustrated using eccentric pivotal supporting means 11 and 12. The pivot bearing 20 is eccentric with respect to the mounting of the pivot pin in the frame 10, such as the frame bearing 21, so that turning of the pivot pin adjusts the position of the gage member with respect to the other gage member. The eccentric form of pivot pin may be substituted by any other suitable form of means for adjusting the position of one or both gage members. Although at least one of the pivot pins or the pivotal supporting means for a gage member is adjustable, the pivot pins are fixed in position when in use so that they are normally fixed to the frame or immovable with respect to each other. Hence the gage members are immovable with respect to each other when being used excepting as to their pivotal movement. The pivot pin may be locked in adjusted position by any suitable means such as a lock screw 22.

The gaging members are adjusted with respect to each other so that the smallest allowable size of screw will not pass beyond the minimum spacing between the gage members. With two pivoted gage members such as 13 and 15 this minimum position is determined by a line through the centers of the pivot bearings of the pivot pins 11 and 12 and correspond with the position intercepted by the line C. A suggested setting of the gaging members is such that a setting plug which is .005 of an inch smaller than the minimum size of screw or test part which is acceptable or within the allowed tolerances will just pass through minimum spacing but nothing larger will pass through. A not go setting plug may be used for this purpose. As a consequence of this setting, no test part which is within the allowable tolerances will pass between the gage members and all allowable sized or dimensioned test parts will halt approximately at the position 17. It will be observed therefore, that the smallest allowable size of test part will approach nearest to minimum spacing, i. e. line C between the gage members and larger diameters of test parts will not approach as near to minimum spacing of the gage members. In other words the smaller diameter test parts will swing the gage members through a greater angle and larger diameters of test parts will swing them through lesser angles. This characteristic of the setting of the gage members may be utilized to make a comparative test of sizes of test parts within the allowable tolerances.

Means is provided which is operated by a pivoted gage member to indicate the position thereof. This indicating means may take various forms, the simplest form being illustrated in Figure 8. The indicating means shown comprises essentially an extension or means carried by the gaging member which cooperates with means carried by the frame so that the relative position or angle of the gage member may be indicated. The angle of the gage member when halted by a test part between the gage members may be calibrated with respect to the diameter of the test part.

In the construction illustrated in Figures 1 and 2 the means to indicate the position of the gage member includes an extension 25 which is secured to the gage member in any suitable fashion such as by being threaded thereinto. The extension 25 may carry an adjusting collar 26 which is locked in position by a screw 27. A spacing collar or collars 28 may be mounted upon the extension part for adjusting the collar 26 and the face of the gage member. The adjusting collar may carry an offset pin 29. As the gage member pivots the end of the offset pin 29 moves farther to the right and it engages and operates the operating pin 32 of an indicator such as the dial indicator 30.

In the construction particularly illustrated in Figures 1 and 2, two sets of gage members operate one indicator 30 by means now to be described. The frame 10 carries a plate 33 which is mounted upon the frame for free lateral movement. The mounting particularly illustrated includes a hole 34 in the frame 10 and the plate 33 carries a pin 35 which is preferably cylindrical so that the plate 33 may rotate as well. In order to get an indication on the indicator 30 all that is necessary is that the plate have freedom of movement laterally. With the plate 33 mounted for rotation as well, the contact between the offset pin 29 and the plate during a gaging operation, tends to rotate the plate and thereby decreases the wear thereupon as well as on the end of the offset pin and constantly presents a new surface of the plate so that it has no or practically no wear. The indicator 30 is secured to the frame in any suitable fashion that illustrated being a supporting bar 31. The mounting for the indicator shown in Figure 3 may be used.

The gage illustrated in Figures 1 and 2 is an analyzer gage. For this purpose the so called go or overall assemble-ability gage members 13 and 15 are relatively wide or axially long so that the gaging means 14 and 16 engage a relatively extensive length of a plain cylindrical test part or a relatively large number of threads upon a screw thread to be tested. The overall characteristics of the cylinder or screw thread or its overall ability to assemble with its mating part is to be determined in the so called go gage members. A second set or pair of gage members 38 and 39 have gaging means 40 and 41 which also are preferably concave. This pair of gage members is mounted similarly to the gage members 13 and 15. The gaging means 40 and 41 differ from 14 and 16 of gage members 13 and 15 in that they are narrow in width so that they engage a relatively short axial distance upon the surface of the test part. For testing a screw thread the gaging means or surfaces 40 and 41 would have not more than three threads so that they are not influenced by taper or faulty lead, but are influenced primarily by the diameter. For a screw thread, the gaging means would have screw threads which are relieved at both the top and bottom in accordance with "not-go" gaging practice so that a screw thread is engaged in the region of the pitch diameter thereof. The gage members 38 and 39 are set in the same fashion that the gage members 13 and 15 are set so that the minimum allowable diameter of test part will not pass therebetween, that is the gage members, when engaging the minimum allowable diameter of test part, will halt with their respective axes above the center line C through the centers of the pivot pins.

One of the gage members such as the gage member 39 carries an extension such as carried by the gage member 15 and hence will not be again described. The plate 33 is engaged by the end of the extension carried by the gage member 39 and moves the plate laterally in accordance with the position assumed by the gage member when a test part is inserted between the gage members to show an indication of the position of the gage member on the indicator 30. The operation of the plate 33 and the indicator is the same as that described for the pair or set of gage members 13 and 15. It will be observed that a very simple and inexpensive comparator and analyzer gage is provided in the construction described in which a single indicator is used for a plurality of sets or pairs of gage members.

The analyzer gage is used to analyze a test part in the manner now to be described. The cylindrical test part or screw thread is presented to the gage members 13 and 15, which tests for overall assembly-ability, pivoting them downwardly until the test part is gripped or engaged therebetween. In the latter part of the pivotal movement of the gage member, at least throughout the tolerance range, the end of the extension of offset pin 29 engages the plate 33 to move it laterally or outwardly a distance depending upon the size of the test part. If the test part is oversize because of some defect in its dimension, it will swing the extension a relatively small distance and the dial indicator will read oversize or an oversize dimension. This test part may be rejected or reworked. If the indicator reads within the allowable tolerances, the reading may be taken such as plus or minus the ideal or exact size. This enables the test part to be graded or sorted with test parts of the same size or indicator reading.

If the indicator reads within the allowable tolerances, the test part is removed and then presented to the not go or diameter gage members 38 and 39. For a screw thread these would be pitch diameter gage members. The gage members swing towards the minimal spaced distance or center line C but do not pass beyond it, unless the screw thread is substantially undersize, so that the extension carried by the gage member 39 engages the plate 33 and moves it laterally which in turn moves the operating pin 32 laterally to give an indication upon the indicator 30. It may be that a plain surfaced cylindrical part or a threaded test part may have a taper but its maximum diameter is proper so that this test part may show an indication when presented to the overall assemble-ability gage members 13, 15 and being within the allowable tolerances. When presented to the not go or diameter gage members 38, 39 an undersized diameter may be shown in some portion of its length. In other words, the gage members 13, 15 test for overall assembleability and although such a test part will assemble with its mating part yet the reading taken from the diameter gage members 38, 39 will reveal it as being tapered or undersized at some portion of its length. If this exists in a screw thread it may mean inadequate gripping of this screw thread within its mating part. The analyzer gage reveals such defects in cylindrical or threaded parts. The analyzer gage also is useful on the so called grading of test parts. In other words, assume that the tolerance is plus or minus 3/1000 of an inch. The test part may be graded as plus one, two, or three, or minus one, two, or three so that it may be assembled with a mating part having a comparable grading whereby maximum holding efficiency between the assembled screw threads is assured or more perfect fit between plain cylindrical parts.

The analyzer gage is revealing in another important manner with respect to screw threads. It may be that a thread or test part may give an indication of plus three or a maximum in the overall assembly-ability gage members. When this test thread is presented to the pitch diameter gage members, however, it may give an indication of minus three. This relation of the reading of the indicators is proof of a faulty lead in the thread and the amount of lead error can be determined by calculation. A test thread which gives this indication would set up a concentrated strain with its mating part and may cause a defective assembly or a functional failure in operation. A far better thread would be one that gave a zero differential reading, that is, a minimum-minimum reading or a maximum-maximum reading since that would indicate that there is no lead error and assurance is given that the thread will carry its intended load.

A comparator type of gage is illustrated in Figure 3. The gage members 13 and 15 in this gage are identical with those described in connection with the gage of Figures 1 and 2 and hence will not be again described. In this comparator gage pivoted gage members are provided to give an indicator reading of overall assemble-ability of the test part which will give a comparative indication of the overall assemble-ability of a plain surfaced test part or of a thread to be tested and also so that the test parts may be graded as to their plus or minus indicator reading. In this construction an extension 43 carried by the gage member 15 alone operates the indicator 30. The not go gage members are of the conventional snap gage style and include gaging rollers 44 and 45 which are set so that a minimum diameter or size of test part will not pass therethrough. If the test part is undersized, it will pass between the not go gage rollers and be rejected. The gage of Figure 3 illustrates a construction which presents the test part with a uniform pressure. In other words inspectors in presenting test parts to the gage may differ as to the pressure that they exert so that it is possible that two inspectors will get different readings with the same test part. This variation can be removed by providing the gage member 13 with an extension or handle 47. A lever 48 is pivoted to the frame on a pivot 49 and is propelled upwardly by a spring 50, one end of which is anchored in a hole 52 in the base 54 and the other end is anchored in a hole 53 in the lever. The lever 48 may be propelled downwardly so that it does not engage the handle 47 either by hand or by a foot pedal (not shown) connected with the connecting link 51. If one of the gage members is propelled to open position by a spring then depression of the lever 48 removes the influence of the spring 50 and the gage members open to their open position. Upon release of the lever 48 the spring 50 exerts its influence and pivots the gage member 13 towards center or minimum spacing. With a test screw between or within the gaging means, the screw is propelled downwardly and the gage member 15 is also propelled downwardly therewith against the tension of springs 108 and 109. The spring 50 exerts uniform pressure so that any variation in the handling of a gage by individual inspectors is eliminated.

A taper gage is shown in Figures 4 and 5. The gage members 13 and 15 of Figure 1 are similarly mounted for pivotal movement upon the frame and having an extension or connection 43 carried by the gage member 15 similar to that of Figure 3 which operates the indicator 30 to obtain an indication or reading thereupon. The gage members 13 and 15 differ only in that the gaging means 55 and 56 respectively, shown particularly as concave gaging surfaces, are tapered to accommodate either a tapered plain surface or are taper threaded for gaging tapered screw threads. The frame has an anvil or stop 57 at the smaller diameter of the gaging means or gage members although this is not essential. Although Figure 5 shows the extension 43 offset with respect to the axis of the contact button 32, it is clear that it may be in axial alignment therewith.

The taper gage is used slightly differently from the straight gages heretofore described and the difference in operation is occasioned because of the difficulty of predetermining the relative axial position to present the test part to the gage members. It is for this reason that a tapered test part is presented to the gage members 13 and 15 spaced axially towards the larger end of the taper. The gage members are set similarly to the gage members of the gage of Figures 1 and 2 so that the test part will not pass through center position or through the gage members. A test part with plain tapered surfaces is positioned axially until its end engages the anvil 57 and pressed downwardly in the gaging means 55, 56, which pivots the gage members downwardly until the gaging surfaces contact the test part. A reading is then taken. The test part need not have its end abutting the anvil when inserted into the gage in which case, when the gage members contact the test part, the latter is pushed axially against the anvil. This causes the gage members to pivot upwardly slightly and a reading is taken. For a taper screw thread the test taper thread is presented in the same manner as for a smooth cylindrical test part. For a taper screw threaded test part, when presented to the gage members with its end spaced from the anvil, then the test part is rotated until the small end lightly engages the anvil 57 and a reading is taken upon the indicator.

It is clear that the anvil is not necessary with the taper gage. If an anvil is not provided the gaging procedure is as described above but the taper part after being presented laterally into the gage members is then moved axially, or for a screw thread rotated to move the same axially, until the small diameter end of the test part is sighted or even with a reference point which may be the small diameter and or edge 58 of a gage member.

The testing of a tapered test part with a gage of the construction described above with tapered gaging surfaces or means does not give any information as to the taper of a plain surfaced taper or a taper thread. In order to obtain a thorough and complete test of tapered parts, other gages may be provided like that of Figures 4 and 5 havng gage members such as shown in Figures 6 and 7. The gage members 59 have a relatively narrow gaging means 60 to engage the large diameter end of the test part and the gage members 61 of Figure 7 have a relatively narrow gaging means 62 at the small diameter end of the taper. The complete test therefore would be to present a test part to the overall assembleability gage members 13 and 15 of Figures 4 and 5 and thereafter to present the test part to a gage having gage members such as shown in Figure 6 which will measure or indicate the large diameter end of the taper thread. The test part is then presented to a gage having gage members as shown in Figure 7 which tests the small diameter end of the tapered test part. With this test a thorough knowledge is obtained as to the overall ability of the taper or tapered thread to assemble with its mating part as well as the correctness or inaccuracy of the taper. For a smooth surfaced tapered part the gaging means 60 and 62 would be smooth surfaced.

In the gages described and illustrated in Figures 1 through 7 the concave gaging means preferably have a radius or diameter corresponding to that of the largest diameter of allowable test part to be gaged thereby. Their radii may be larger than that of the largest allowable test part but their radii should not be less for best results. This assures that for all allowable test parts less than the maximum allowable test part, the engagement with the gaging means will be essentially a diametrical engagement.

It is not essential that the gaging means carried by the gage members be concave gaging surfaces as illustrated in the gages of Figures 1 through 7 nor is it essential that two pivoted gage members be used. A simple form of construction which embodies the principles of the invention and is effective is shown in Figure 8. A frame 66 carries a pivotal supporting means 67 which may be an adjustable pivot pin similar to the pivot pin 11 or 12. A gage member 68 is pivotally mounted upon the pivot pin which gage member carries gaging means in the form of gaging rollers 69 each carried upon a pin 70. At least a pair of gage rollers is used which is the number illustrated. The gaging rollers 69 are spaced from each other so that they engage a plurality of points around the circumference of the test part T, two points being engaged with two rollers as illustrated. A gage member having gaging means formed of rollers is in effect a concave gaging means which becomes more apparent as the number of rollers used is increased. In any event the gaging means formed thereby faces radially outwardly as in the concave gaging surfaces illustrated in the other forms.

The other gaging means may be a surface 71 carried by the frame which surface may be straight or curved as desired and provides a third point of contact with the test part. It is clear that a pivoted gage member 68 may be provided in place of the surface 71 in which case four points of contact around a test part are provided. The gage member 68 is adjusted so that a test part will not pass through the point of minimum spacing between the gaging means which would correspond with the line C. In other words the setting is similar to that described in connection with the other gages disclosed herein.

The gage member 68 carries an extension 74, in the form of a pointer, which moves along indicia 75 carried by the frame 66. These indicia and the pointer 74 comprise an indicator for determining whether or not the test part is within the allowable tolerances and also indicates the deviation in dimensions from an ideal or accurate sized part. Although the pointer varies in angular position for different sized test parts, nevertheless the indicia may be calibrated in variation in diameter as in the other gages.

Figure 10:
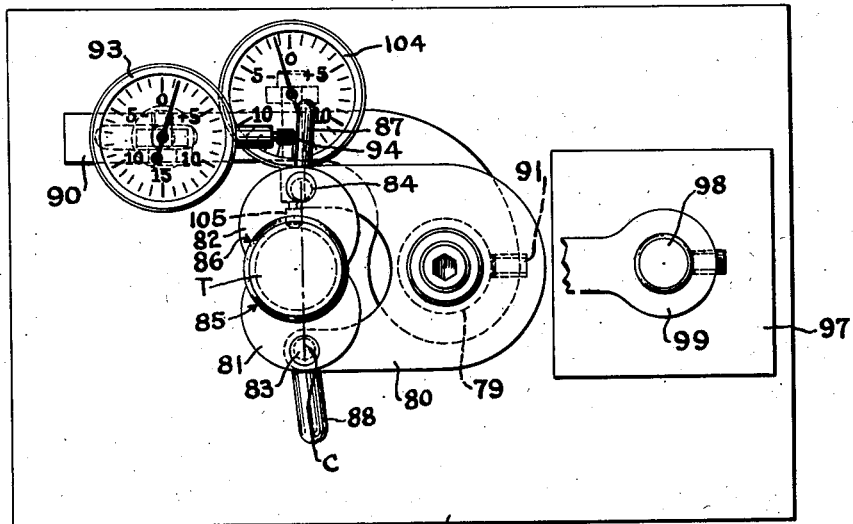
Figure 10 is a plan view of the gage of Figure 9.

The gage of the invention may also be constructed to determine the squareness of some portion of a test part with respect to a threaded part thereof or a cylindrical part. The squareness may be that of an end surface or it may be the squareness or concentricity of another cylindrical part. Such a gage is shown in Figures 9 and 10 in which a base 78 carries a pillar or pedestal 79 upon which is mounted a frame 80. The frame 80 carries a pair of gage members 81 and 82 pivoted to the frame on pivot pins 83 and 84 respectively. One or both pins may be of an adjusting type.

Each gage member carries gaging means 85 and 86 respectively, shown as concave surfaces, for engaging the test part T. The gage members are adjusted so that a minimum diameter of test part will not pass to the position of minimum spacing which corresponds with the line C through the centers of the pivot pins. A test part, therefore, is gripped by the gage or gripping members. The gage member 82 carries an extension 87 and the gage member 81 also carries an extension 88, either of which may serve as a handle or may be used to operate an indicator.

The gaging or gripping means 85 and 86 in the form of gage of Figures 9 and 10 preferably have a concavity or radius which is the same as that of the minimum allowable size or diameter of the part to be gaged or gripped so that for larger sizes there will be four point contact with the test part at the ends of the concave surfaces. This provision assures that a test part will not be gripped at only two diametrically opposite points.

The pedestal 79 may carry an arm 90 which is locked in position on the pedestal by a set screw 91. The arm 90 may have a slot 92 for mounting an indicator 93. The contact button 94 of the indicator engages the extension 87 so that an indication or gaging of a screw thread or cylindrical surface of a test part may be made as in the gages described herein. The indicator 93 may be adjusted so that the contact button 94 thereof engages anywhere along the length of the extension 87. In this way the multiplication factor of the indicator reading may be adjusted at will. In other words if a greater multiplication is desired the button 94 will engage farther outwardly upon the extension 87 with respect to the pivot pin 84.

It is to be understood that it is not necessary to gage that portion of the test part engaged in the gage members 81, 82 in which case they serve as grippers of a test part. While the test part is gripped by the gripping or gage members, the end surface thereof may be tested as to its squareness with respect to the thread or surface engaged by the gage members or grippers. To accomplish this test a sliding base 97 is provided to rest upon a smooth surface such as the top of the base 78. The sliding base carries a pillar 98 to which an arm 99 is secured, the arm carrying an indicator 100. The contact button 101 of the indicator is then moved over the end surface by sliding the base 97 upon the top surface of the base 78. Three or more positions over the end surface will give an indication of the squareness of this surface with respect to the gripped portion of the test part. The gage may also test as to the concentricity or eccentricity of a cylindrical surface P on the test part. In order to accomplish this test, an indicator 104 may be suitably mounted upon the gage such as on the arm 90 and its contact button 105 engages the surface P. The test part is inserted between the gripping or gage members 81 and 82 and a reading is taken upon the indicator 104. The test part is then removed and turned through 90° and again presented to the gripping members 81 and 82 or turned therein and a reading is taken upon the indicator 104. The concentricity or eccentricity of the surface P with respect to the gripped portion of the test part is determined by a comparison of the readings taken upon the indicator 104. It is clear that the portion gripped by the gripping members 81 and 82 may be a smooth cylindrical surface in which case the gripping surfaces 85 and 86 may be plain cylindrical surfaces or may be a screw thread as shown. The gripped portion also may be gaged if desired when it is being gripped.

The device of Figures 9 and 10 may be used as a chuck for holding a cylindrically or particularly a threaded part while a machining or grinding operation is performed on another part. For example the test part T may be held in the device while a grinding operation is performed upon the surface S in order to assure that it is finished with its end square with respect to the screw thread. Since the gripping members 81 and 82 have a toggle gripping action the part T can be held firmly with little pressure. Similarly the gripping members may be used to hold the part T while performing an operation upon the portion P thereof.

In the gages of Figures 1 through 5 the indicator is operated by contact with the end of the extension of the respective gage member. The factor of amplification or multiplication of the reading may be varied by using longer or shorter extensions. It is clear too, that any of the indicators used with the gages illustrated in Figures 1 through 5 may be mounted to engage the extension in the manner shown in Figure 10. Similarly the indicators of the squareness or concentricity gage of Figure 10 may be operated in the manner shown in the gages of Figures 1 through 5.

The gage illustrated and described may have means such as springs 108, 109 to return the gage members to open position, so that the gages will be ready at all times to receive a test part or may be constructed with drag means such as a spring washer 107, Figs. 2 and 5, which holds the gage members in open position to which they are moved upon removal of a test part therefrom. The gage members also may be operated by the extensions or handles. It is contemplated that the gages may be constructed for operation and use in any of these ways. Again it may be desirable to have but one gage member operated to return to open position as in the uniform pressure gage of Figure 3 in which a spring 108 impels the gage member 15 to up or open position and spring 50 impels gage member 13 to down position over the tension of spring 109. The opening springs may take any form and may be located in various positions to accomplish their opening function.

The indicators in the gages described should be contacted by the gage member or its extension to indicate the position of the gage member at least through the gaging range, however, a greater extent of contact or of the movement should be indicated for practical reasons. It is not necessary, however, that the indicator be operated throughout the extent of movement of the gage member.

The gages described herein are particularly useful where accurate mating of screw threads is desired. There are many applications of taper threads of the so called "dryseal pressure-tight joints" in which there is no clearance permitted between the internal and external threads so that the flanks and flats of the thread meet in metal to metal joint. This permits the elimination of a sealer in assembling the threaded connection. With the gages herein the screw threads may be graded so that internal and external threads may be assembled together to give such dryseal connection. Such grading is applicable to straight threads also although such connections are customarily made with taper threads.

The invention is presented to fill a need for improvements in an indicating type gage. It is understand that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gage comprising a frame, gaging mechanism carried by the frame including a gage member having gaging means which engages a part at a plurality of points around the outer periphery thereof and provides a gaging axis, a second gage member cooperating with the first gage member, means for pivotally supporting the first gage member which means is normally fixed to the frame at a point spaced from the axis of the gaging means and located so that this axis lies between the second gage member and the pivotal supporting means for the first gage member with the gaging means facing substantially radially outwardly from its pivotal supporting means and so that the first gage member pivots towards and away from the second gage member and its gaging means into and away from gaging position upon a circular path radially spaced from the second gage member, the gaging members when in use being positioned relatively to each other so that a test part of minimum allowable dimension will not pass through center position between the gage members, an extension carried by the first gage member and pivotal therewith, and means cooperating with the extension to indicate the position of the gage member at least through the gaging range.

2. A gage comprising a frame, gaging mechanism carried by the frame including a gage member having gaging means which engages a part to be tested at a plurality of points around the periphery thereof and provides a gaging axis, a second gage member cooperating with the first gage member, means which is normally fixed to the frame pivotally supporting the first gage member at a point spaced from the axis of the gaging means and located so that this axis lies between the second gage member and the pivotal supporting means for the first gage member with the gaging means facing substantially radially outwardly from its pivotal supporting means and so that the first gage member pivots towards and away from the second gage member and its gaging means into and away from gaging position upon a circular path radially spaced from the second gage member, the gaging members when in use being positioned relatively to each other so that a test part of minimum allowable dimension will not pass through center position between the gage members, an extension carried by the first gage member and swingable therewith, and an indicator operated by the extension to indicate the position of the gage member at least throughout the gaging range.

3. A gage comprising a frame, gaging mechanism carried by the frame including a gage member having gaging means which engages a part to be tested at a plurality of points around the periphery thereof and provides a gaging axis, a second gage member cooperating with the first gage member, means which is normally fixed to the frame pivotally supporting the first gage member at a point spaced from the axis of the gaging means and located so that this axis lies between the second gage member and the pivotal supporting means for the first gage member with the gaging means facing substantially radially outwardly from its pivotal supporting means and so that the first gage member pivots towards and away from the second gage member and its gaging means into and away from gaging position upon a circular path radially spaced from the second gage member, the gaging members when in use being positioned relatively to each other so that a test part of minimum allowable dimension will not pass through center position between the gage members, an extension carried by the first gage member and swingable therewith, and an indicator engaging the end of the extension throughout the gaging range to indicate the position of the gage member at least through the gaging range.

4. A gage comprising a frame, gaging mechanism carried by the frame including a gage member having gaging means which enages a part to be tested at a plurality of points around the periphery thereof, and provides a gaging axis, a second gage member cooperating with the first gage member, means which is normally fixed to the frame pivotally supporting the first gage member at a point spaced from the axis of the gaging means and located so that this axis lies between the second gage member and the pivotal supporting means for the first gage member with the gaging means facing substantially radially outwardly from its pivotal supporting means and so that the first gage members pivots towards and away from the second gage member and its gaging means into and away from gaging position upon a circular path radially spaced from the second gage member, the gaging members when in use being positioned relatively to each other so that a test part of minimum allowable dimension will not pass through center position between the gage members, and extension carried by the first gage member and movable therewith, means to adjust the extension, and an indicator engaged by the extension to indicate the position of the gage member at least through the gaging range.

5. A gage comprising a frame, a pair of cooperating gage members each having a concave gaging means which engage a part at a plurality of points around the outer periphery thereof and provides a gauging axis, pivotal supporting means for each gage member which means are normally fixed to the frame and widely spaced with respect to each other and located so that the gaging axis lies between one gage member and the pivotal supporting means for the other gage member with the gaging means facing substantially radially outwardly from their pivotal supporting means and so that each gaging member pivots towards and away from the other gaging member and its gaging means into and away from gaging position upon a circular path radially spaced from the other gage member, the gaging members when in use being positioned relatively to each other so that a test part of minimum allowable dimension will not pass through center position between the gage members, an extension carried by one gage member and movable therewith, and an indicator engaged by the extension to indicate the position of the gage member at least through the gaging range.

6. A taper gage comprising a frame, a gage member having a taper gaging means which engages a part at a plurality of points around the outer periphery thereof and provides a gaging axis, a second gage member cooperating with the first gage member, means for pivotally supporting the first gage member which is normally fixed to the frame at a point spaced from the axis of the gaging means and located so that this axis lies between the second gage member and the pivotal supporting means for the first gage member with the gaging means facing substantially radially outwardly from its pivotal supporting means and so that the gaging member pivots towards and away from the second gaging member and its gaging means into and away from gaging position upon a circular path radially spaced from the second gage member, the gaging members when in use being positioned relatively to each other so that a test part of minimum allowable dimension will not pass through center position between the gage members, an anvil carried by the frame adjacent the smaller end of the taper gaging means, an extension carried by the first gage member and movable therewith, and an indicator engaged by the extension to indicate the position of the gage member at least through the gaging range.

7. A gage comprising a frame; a plurality of gaging sets carried by the frame each set including a gage member having gaging means which engages a part to be tested at a plurality of points around the periphery thereof and provides a gaging axis, a second gage member cooperating with the first gage member, means which is normally fixed to the frame pivotally supporting the first gage member at a point spaced from the axis of the gaging means and located so that this axis lies between the second gage member and the pivotal supporting means for the first gage member with the gaging means facing substantially radially outwardly from its pivotal supporting means and so that the first gage member pivots towards and away from the second gage member and its gaging means into and away from gaging position upon a circular path radially spaced from the second gage member, the gaging members of each set when in use being positioned relatively to each other so that a test part of minimum allowable dimension will not pass through center position between the gage members, and an extension carried by each first gage member and movable therewith; an operating member carried by the frame and engageable by each extension, and a single indicator operated by the operating member to indicate the position of a gage member at least through the gaging range.

8. A gage comprising a frame; a plurality of gaging sets carried by the frame each set including a gage member having gaging means which engages a part to be tested at a plurality of points around the periphery thereof and provides a gaging axis, a second gage member cooperating with the first gage member, means which is normally fixed to the frame pivotally supporting the first gage member at a point spaced from the axis of the gaging means and located so that this axis lies between the second gage member and the pivotal supporting means for the first gage member with the gaging means facing substantially radially outwardly from its pivotal supporting means and so that the first gage member pivots towards and away from the second gage member and its gaging means into and away from gaging position upon a circular path radially spaced from the second gage member, the gaging members of each set when in use being positioned relatively to each other so that a test part of minimum allowable dimension will not pass through center position between the gage members, and an extension carried by each first gage member and movable therewith; an operating plate, means mounting the operating plate upon the frame and engageable by each extension and for free movement laterally, and a single indicator operated by the operating plate to indicate the position of a gage member of each gaging set at least through the gaging range.

9. A gage comprising a frame; a plurality of gaging sets carried by the frame each set including a pair of cooperating gage members having gaging means which engage a part at a plurality of points around the outer periphery thereof and provide a gaging axis, the gage members of each pair including a second gage member cooperating with a first gage member, means which is normally fixed to the frame pivotally supporting the first gage member at a point spaced from the axis of the gaging means and located so that this axis lies between the second gage member and the pivotal supporting means for the first gage member with the gaging means facing substantially radially outwardly from its pivotal supporting means and so that the first gage member pivots towards and away from the second gage member and its gaging means into and away from gaging position upon a circular path radially spaced from the second gage member, the gaging members of each set when in use being positioned relatively to each other so that a test part of minimum allowable dimension will not pass through center position between the gage members, an extension carried by each first gage member and movable therewith, an operating plate, means mounting the operating plate upon the frame for free lateral and rotary movement thereof and engageable by each extension, and an indicator operated by the operating plate to indicate the position of a gage member of each gaging set at least through the gaging range.

10. A gage comprising a frame; a pair of gaging sets carried by the frame each set including a gage member having gaging means which engage a part at a plurality of points around the periphery thereof and provides a gaging axis, a second gage member cooperating with each first gage member, means which is normally fixed to the frame pivotally supporting the first gage member at a point spaced from the axis of the gaging means and located so that this axis lies between the second gage member and the pivotal supporting means for the first gage member with the gaging means facing substantially radially outwardly from its pivotal supporting means and so that the first gage member pivots towards and away from the second gage member and its gaging means into and away from gaging position upon a circular path radially spaced from the second gage member, the gaging members of each set when in use being positioned relatively to each other so that a test part of minimum allowable dimension will not pass through center position between the gage members, an extension carried by each first gage member and movable therewith; an operating plate having a pin, the frame having a hole in which the pin is received and freely slidable and mounting the plate upon the frame and engageable by each extension, and an indicator operated by the operating plate to indicate the position of a gage member of each gaging set at least through the gaging range.

11. A taper gage comprising a frame, a pair of gage sets carried by the frame each set including a gage member having gaging means which engage a part at a plurality of points around the outer periphery thereof and provides a gaging axis, a second gage member cooperating with the first gage member, means for pivotally supporting the first gage member which is normally fixed to the frame at a point spaced from the axis of the gaging means and located so that this axis lies between the second gage member and the pivotal supporting means for the first gage member with the gaging means facing substantially radially outwardly from its pivotal supporting means and so that the first gage member pivots towards and away from the second gage member and its gaging means into and away from gaging position upon a circular path radially spaced from the second gaging member, the gaging members of each set when in use being positioned relatively to each other so that a test part of minimum allowable dimension will not pass through center position between the gage members, an extension carried by each first gage member and movable therewith, an operating plate having a cylindrical pin, the frame having a cylindrical hole receiving the pin in which the latter is freely slidable and rotatable, each extension engaging the plate, and an indicator operated by the operating plate to indicate the position of a gage member of each gage set at least through the gaging range.

12. A gage and squareness or concentricity tester for a test part having a cylindrical portion and a portion to be tested as to squareness or concentricity with respect thereto comprising a frame, a gage member having a gaging means which engages a part to be tested at a plurality of points around the periphery thereof and provides a gaging axis, a second gage member cooperating with the first gage member, means pivotally supporting the first gage member which means is normally fixed to the frame at a point spaced from the axis of the gaging means and located so that this axis lies between the second gage member and the pivotal supporting means for the first gage member with the gaging means facing substantially radially outwardly from its pivotal supporting means and so that the first gage member pivots towards and away from the second gage member and its gaging means into and away from gaging position upon a circular path radially spaced from the second gage member, the gaging members when in use being positioned relatively to each other so that a test part of minimum allowable dimension will not pass through center position between the gage members and the test part is gripped thereby, the gaging means having as a maximum dimension the dimension of the minimum allowable test part, an extension carried by the first gage member and movable therewith, an indicator engaged by the extension to indicate the position of the gage member at least through the gaging range, and at least one other indicator to engage that portion of the test part to be tested for squareness.

STANLEY G. JOHNSON.

REFERENCES CITED

The following references are of record in the file of this patent:

UNITED STATES PATENTS

| Number | Name | Date |
| --- | --- | --- |
| 2,308,011 | Johnson | Jan. 12, 1943 |
| 2,409,280 | Hohwart | Oct. 15, 1946 |
| 2,427,152 | Moore | Sept. 9, 1947 |
| 2,432,160 | Johnson | Dec. 9, 1947 |
| 2,433,516 | Johnson | Dec. 30, 1947 |
| 2,437,160 | Johnson | Mar. 2, 1948 |